United States Patent [19]

Klopotek

[11] Patent Number: 4,797,888
[45] Date of Patent: Jan. 10, 1989

[54] CIRCUIT FOR THE PREIONIZATION AND MAIN DISCHARGE OF A PULSED GAS LASER

[75] Inventor: Peter Klopotek, Brookline, Mass.

[73] Assignee: Lambda Physik, Gottingen, Fed. Rep. of Germany

[21] Appl. No.: 65,510

[22] Filed: Jun. 23, 1987

[30] Foreign Application Priority Data

Jun. 23, 1986 [DE] Fed. Rep. of Germany ....... 3621005
Dec. 22, 1986 [DE] Fed. Rep. of Germany ....... 3644004

[51] Int. Cl.$^4$ .............................................. H01S 3/00
[52] U.S. Cl. ....................................... 372/38; 372/86; 372/82
[58] Field of Search .................... 372/86, 83, 82, 38, 372/81

[56] References Cited

U.S. PATENT DOCUMENTS

| | | | |
|---|---|---|---|
| 3,886,479 | 5/1975 | Pearson | 372/83 |
| 4,308,507 | 12/1981 | Pleasance | 372/82 |
| 4,612,643 | 9/1986 | Long et al. | 372/86 |
| 4,686,682 | 8/1987 | Haruta et al. | 372/83 |

*Primary Examiner*—Leon Scott, Jr.
*Attorney, Agent, or Firm*—Ciotti & Murashige, Irell & Manella

[57] ABSTRACT

A circuit for the preionization and main discharge of a pulsed gas laser provides that the sparks intended for the preionization of the working gas have an independent switch function. Capacitive energy storage means 7, 8, 9, 10 are connected low-inductively to the spark electrodes 3, 4, 5, 6. The current flowing in the spark discharge is used selectively for the preionization by means of the spark or for generating a compressed high-voltage pulse. The compressed high-voltage pulse is applied as prepulse to the main electrodes to momentarily greatly increase the voltage obtaining between the main electrodes and thus initiate and supply a homogeneous main discharge.

13 Claims, 5 Drawing Sheets

① Preionization phase
② Field-multiplication phase (avalanche phase)
③ Supplying of the main discharge
④ Initiation of spark discharges between the spark electrodes

CIRCUIT FOR THE PREIONIZATION AND MAIN DISCHARGE OF A PULSED GAS LASER

The invention relates to a circuit for the preionization and main discharge of a pulsed gas laser.

Pulsed gas laser, for example excimer lasers, $N_2$ lasers and $CO_2$ lasers, are often stimulated transversely by a plasma discharge (TE gas laser). The plasma discharge (also called main discharge) takes place perpendicularly to the optical axis of the laser. The energy necessary for the plasma discharge is stored in a capacitor and transferred to the plasma on discharge thereof. The plasma discharge takes place between main electrodes disposed in the laser chamber parallel to the optical axis.

The power and also other qualities of the laser depend inter alia substantially on the homogeneity of the plasma discharge. To obtain the necesary homogeneity of the plasma discharge at different pressures of the working gas depending on the gas mixture a so-called preionization is necessary prior to the plasma discharge (main discharge). Details on the preionization will be found for example in: A. J. Palmer: "A physical model on the initiation of atmospheric pressure glow", Appl. Phys. Lett. 25 (1974), 136; J. I. Levatter and S. C. Lin: "Necessary conditions for the homogeneous formation of pulsed avalanche discharges at high gas pressure", J. Appl. Phys. 51 (1980), 210; and G. Herziger et al.: "On the homogenisation of transverse gas discharges by preionization", Appl. Phys. 24 (1981), 267.

The preionization of the working gas is carried out inter alia with sparks. Sparks are sources of intense radiation which is adequately short-waved to photoionize in a substantially one-stage process an atom or molecular type present in the working gas and thus to generate free electrons in adequate concentration in the space between the main electrodes. The UV light irradiation by the sparks must therefore reach the space between the main electrodes so that on adequate concentration of the free preionization electrons the plasma discharge starts homogeneously. The sparks are generated between the spark electrodes which are provided additionally to the main electrodes. The spark electrodes are generally disposed in the vicinity of the main electrodes (K. Miyazaki et al.: "Efficient and compact discharge XeCl laser with automatic UV preionisation", Rev. Sci. Instru. 52 (1985), 201). It is also possible to make the main electrodes of optically substantially permeable metallic screens or sieves so that the spark electrodes can be disposed behind the main electrodes (C. R. Tallman: "A study of excimer laser preionization techniques", Topical Meeting on Excimer Lasers 1979, Paper WB4-1; R. S. Taylor et al.: "Time-dependent gain and absorption in a 5 J UV-preionized XeCl laser", IEEE QE 19 (1983), 416; Levatter: EP No. 0033424; A. J. Kearsley et al.: "A novel pre-ionisation technique for discharge excited rare gas halide lasers", Opt. Comm. 31 (1979), 181; S. Watanabe and A. Endoh: "Wide aperture self-sustained discharge KrF and XeCl lasers", Appl. Phys. Lett. 41 (1982), 799). An arrangement of the spark electrodes laterally adjacent the two main electrodes is apparent from the works by C. R. Tallmann: "A study of excimer laser preionization techniques", Topical Meeting on Excimer Lazers 1979, Paper WB4-1; C. E. Webb: "Quantum Electronics and Electro-Optics", Ed. by P. L. Knight, 1983, John Wiley & Sons Ltd., p. 3; and A. J. Kearsley et al.: "A novel pre-ionisation technique for discharge excited rare gas halide lasers", Opt. Comm. 31 (1979), 181.

With regard to the electrical supply a distinction may be made between two different groups of known pre-ionization systems by means of sparks: On the one hand in the so-called autonomous preionization circuits the current supply of the spark electrodes takes place independently of the supply of the plasma discharge (R. S. Taylor et al.: "Glow discharge characteristics of a 0.8 Joule multi-atmosphere rare gas halide laser", Opt. Comm, 25 (1978), 231 or R. S. Taylor et al.: "Time-dependent gain and absorption in a 5 J UV-preionized XeCl laser", IEEE QE 19 (1983), 416) whereas in the so-called automatic ("integrated") spark preionization the electrical supply of the spark electrodes is integrated into the plasma discharge (K. Miyazaki et al.: "Efficient and compact discharge XeCl laser with automatic UV preionization", Rev. Sci. Instr. 52 (1985), 201; J. I. Levatter: EP No. 0033424; A. J. Kearsley et al.: "A novel pre-ionisation technique for discharge excited rare gas halide lasers", Opt. Comm. 31 (1979), 181).

On the other hand in one type of spark preionization a plurality of sparks were fed in series (travelling wave) from a current path (R. S. Taylor et al.: "Time-dependent gain and absorption in a 5 J UV-preionized XeCl laser", IEEE QE 19 (1983), 416; S. Watanabe and A. Endoh: "Wide aperture self-sustained discharge KrF and XeCl lasers", Appl. Phys. Lett. 41 (1982), 799) whereas in another type of spark preionization the sparks are fed independently of each other (parallel). In the latter preionization in the supplying of a predetermined spark discharge between associated spark electrodes it is not necessary to supply the adjacent spark discharges as well (A. J. Kearsley et al.: "A novel pre-ionisation technique for discharge excited rare gas halide lasers", Opt. Comm. 31 (1979), 181; C. E. Webb: "Quantum Electronics and Electro-Optics", Ed. by P. L. Knight—1983, John Wiles & Sons, Ltd., p. 3; Miyazaki et al.: "Efficient and compact discharge XeCl laser with automatic UV preionisation", Rev. Sci. Instr. 52 (1985), 201).

In all the circuits cited so far for spark preionization the sparks are supplied from highly inductive power circuits. This high inductance of the power circuits supplying the spark discharge is due to the fact that the spark current during the preionization flows in series with a punctual switch such as a spark gap or thyratron (cf. e.g. Optics Communications, 31, (1979), p. 181, FIG. 1). The maximum spark current is limited by the power capacity of the switch. In addition the impedance of the spark discharge is very small and thus the adaptation of the highly inductive spark supply circuit to the spark discharges very poor. The inductance of the spark supply circuits known from the cited publications rapidly reaches values above 100 nH so that within one oscillation period only a very small part of the stored energy is converted to the spark formation and thus the preionization.

European patent application No. 33,414 discloses a circuit of the "automatic" type mentioned above for spark generation in which the switch itself is a low-inductive linear spark gap (rail gap). This circuit comprises a low-inductive power circuit for supplying the sparks. The sparks are fed independently (parallel).

In all the known spark preionization systems a switch is used which lies in series with the spark discharges and the spark discharges take place only "at the command" of said switch. In the known preionization systems the preionization spark discharge thus does not perform and independent switching function.

The already mentioned high inductance of the power circuit feeding the spark discharge, i.e. the poor adaptation of the power circuit to the low-inductive spark discharge, is not detrimental in the known circuits of the aforementioned "automatic" type because the capacitively stored energy is to be transferred for the greater part to the plasma discharge (main discharge). In the aforementioned autonomous systems in which the sparks are fed from a circuit separate from the main discharge circuit considerable disadvantages result: Firstly, the efficiency of the conversion of the capacitively stored energy to the preionization is low. Also, the radiation emission of the sparks takes place over a relatively long period and a consequence of this with electronegative gases such as HCl or $F_2$ is that the free electrons initially generated by photoionization are again captured (electron attachment). Thus, due to the long period of the spark preionization the concentration of the free electrodes in the space between the main electrodes is undesirably lowered. Also, an unnecessarily large amount of electrical charge is conducted by the spark discharges and this can impair the life and functionability of the spark electrodes and be contrary to the requirement of the long life of the laser of at least some 100,000,000 shots. In addition, the large charge transport can lead to gas contamination.

It is also to be noted that the ionization effectiveness of the sparks is a very rapidly increasing function of the spark current. It is thus desirable to transfer the energy used for autonomous preionization in an as intense and short as possible a current possible to the spark discharge.

The problem underlying the invention is to remedy all the aforementioned disadvantages. In particular, an autonomous circuit for the electrical supply of a pulsed TE gas laser is to be provided which permits selectively an excellent preionization and/or the generation of a compressed high-voltage pulse. If the circuit is used for preionization the latter should be as intensive as possible, convert the capacitively stored energy with high efficiency, be less than 200 ns, subject the switch (e.g. a thyratron) generally provided in the pulse high-voltage source to little load and ensure a long life of the preionization system, in particular of the spark electrodes. Moreover, a limited charge transfer by the sparks is desirable for avoiding gas soiling and contamination.

According to the invention this problem is solved in a circuit having the features set forth in the preamble of claim 1 in that the capacitive energy storage means (capacitor) is connected low-inductively to the spark discharge taking place between the spark electrodes, the capacitive energy storage means is charged by the pulse high-voltage source up to the static breakdown voltage, and that the current flowing in the spark discharge is used selectively for the preionization by means of the spark and/or for generating a compressed high-voltage pulse which is entered as working, switching or control pulse into a circuit of the laser other than the voltage supply of the spark electrodes, such as for example the supply circuit of the plasma discharge.

Thus, according to the invention the spark discharge between the spark electrodes is used either for the preionization or for the pulse compression or for both. Pulse compression means that energy capacitively stored over a relatively long period of about 100 nsec to several hundred nsec is converted without substantial losses to a high-pressure pulse compressed, i.e. shortened, in time by for example a factor of 10. Said compressed high-voltage pulse can be supplied as working, switching or control pulse for other purposes than the spark preionization to other switching elements of the laser, for example to the primary side of a pulse transformer or the supply circuit of the plasma discharge.

Thus, according to the invention each individual spark between the spark electrodes itself acts like a switch which conducts the energy stored capacitively prior to the spark breakdown with very low inductance via the spark discharge.

If a plurality of spark electrodes are arranged adjacent each other in the laser chamber the spark discharge takes place partically simultaneously for all spark electrodes. For once a single spark is the first to flashover the spark discharge generates with a negligibly small delay in the adjacent spaces between the spark electrodes enough charge carriers to immediately cause the spark discharge there as well.

In a preferred embodiment of the invention the capacitive energy storage means, for example a capacitor, is connected in parallel to the spark discharge gap between the spark electrodes.

To allow the lowest possible inductive feeding of the spark current in a preferred embodiment of the invention the current path, measured along the shortest travel, on which at least 50% of the spark discharge current flows in the time in which said spark current serves for preionization is not longer than 100 cm for all sparks.

It has surprisingly been found that in contrast to the prior art, where pointed spark electrodes are preferred, particularly good results can be achieved, in particular a long life of the spark electrodes and very stable and reliable operating conditions, if the spark electrodes are made blunt on their opposing sides. Particularly suitable are convexly curved or frusto-conical spark electrodes.

It has also surprisingly been found that the spark length and thus the spark electrode spacing should be relatively great, preferably in the region of 25 to 30 mm.

In a further embodiment of the invention the compressed high-voltage pulse generated as described above is applied as so-called prepulse directly to the main electrodes so that at the main electrodes a voltage increase takes place which together with the preionization already previously initiated leads to breakdown and initiation of the main discharge.

For the quality of the main discharge, in particular its homogeneity and time behaviour, it is necessary for the preionization also to take place as homogeneously as possible, i.e. uniformly in space.

The task of the preionization and of said prepulse is to increase the initially very small concentration of free electrons in the working gas (presumably less than 1 electron per $cm^3$) in as homogeneous as possible a manner up to values of $10^{13}$ to $10^{15}$ per $cm^3$. This increase in the concentration of free electrons by 13 to 15 powers of ten is achieved in two stages. The increase by about the first 7 powers of ten of the concentration of free electrons is effected by the preionization whereas the following powers of ten are obtained by the so-called avalanche process (field multiplication). The preionization operation has substantial influence on the homogeneity of the entire electron multiplication process and thus also on the homogeneity of the main discharge on which the power and other qualities of the laser mainly depend. If during the preionization phase between the main electrodes of the laser chamber an adequately high voltage already obtains free electrons are also generated by the avalanche process. If however this avalanche process already starts before the concentration of free electrons has reached values of about $10^6$ to $10^7$ per cm$^3$ the desired homogeneous generation of free electrons may be considerably impaired. In other words: The initial concentration of about $10^7$ free electrons per cm$^3$ must be generated substantially by the preionization itself (and not by an avalanche process). The number of electrons generated by avalanche processes is a sensitive function of the voltage between the main electrodes in the laser chamber. To prevent avalanche processes form disturbing the concentration of free electrons of about $10^7$ per cm$^3$ generated by means of preionization (that is for example by ionization of UV radiation) the voltage between the main electrodes must be kept correspondingly small in this phase of the preionization. The exact value of a voltage still permissible between the main electrodes (i.e. a voltage at which the avalance processes do not disturb the homogeneous electron generation) depends on the composition of the working gas and the intensity of the preionization. Generally speaking, with increasing intensity of the preionization the admissible voltage between the main electrodes may also increase. A certain simulation of these processes shows that with all conventional preionization methods lasting in each case up to a few hundred ns to generate about $10^7$ free electrons per cm$^3$ the voltage between the main electrodes must not be appreciably greater than twice the breakdown voltage (the voltage which leads to breakdown at the aforementioned higher electron concentrations).

The exact time control of the voltage between the main electrodes and its time adaptation to the preionization is made difficult above all because the generation of free electrons during the preionization depends substantially on the time integral of the preionization intensity whereas the field multiplication (avalanche processes) depends exponentially on the time.

The compressed high-voltage pulse generated according to the invention and applied as prepulse directly to the main electrodes can, with the inductances and capacitances provided, be adapted in time so that the time variation of the voltage between the main electrodes automatically meets the requirements described above without other control and monitoring means. If the inductance L1 of the circuit in which the high-voltage pulse serving as prepulse is adequately small (e.g. less than 5 nH, this depending however on the geometrical arrangement of the circuit elements), the prepulse can be given an ideal time profile with which it firstly considerably reduces the voltage between the main electrodes (so that in this phase of the preionization no troublesome avalanche processes occur) whilst in a subsequent phase the prepulse substantially increases the voltage between the main electrodes until the breakdown voltage is reached. The prepulse thus changes its sign with time. Its polarity at the beginning is chosen such that the voltage between the main electrodes is substantially reduced (e.g. to 0). This period with reduced voltage between the main electrodes lasts for example 15 ns. In this time the working gas between the main electrodes is preionized by the preionization sparks homogeneously to for example $10^7$ free electrons per cm$^3$. Only thereafter does the time variations of the prepulse cause the voltage between the main electrodes to increase very rapidly until due to the then starting field multiplication of the free electrons the plasma discharge takes place in the working gas (the concentration of the free electrons is increased here to values of about $10^{13}$ to $10^{15}$ electrons per cm$^3$). It is obvious that the polarity of the prepulse in the field multiplication phase is the same as the voltage applied by capacitive energy storage means to the main electrodes so that in this phase the two voltages add up whereas previously the voltage made available by the capacitive energy storage means was reduced by the prepulse.

According to a preferred embodiment of the invention it is therefore provided that the prepulse is applied directly to the main electrodes in the laser chamber in such a manner that prior to the increase in the voltage a momentary reduction of the voltage occurs.

Such a variation of the prepulse can be achieved with the low-inductive connecting of the capacitive energy storage means for the spark electrodes according to the invention to the spark discharge taking place between the spark electrodes in that negative and positive interferences as known in high-power pulse electronics are utilized.

Hereinafter some examples of embodiment of the invention will be explained schematicaly with the aid of the drawings, wherein.

Figure 1:
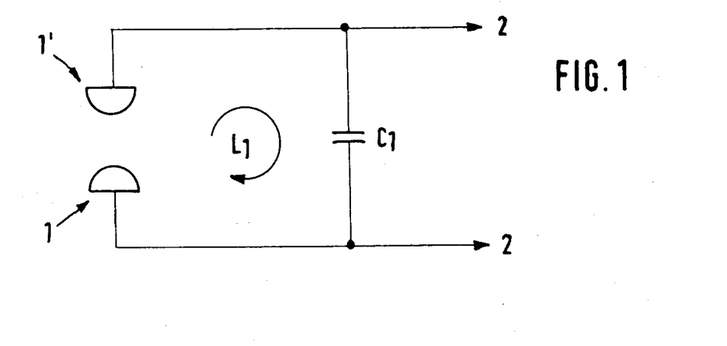
FIG. 1 shows a simple example of embodiment of a circuit according to the invention.

FIG. 1 shows the basic circuit diagram of a circuit for preionization of the working gas of a TE gas laser and-/or for generating a compressed high-voltage pulse. Two spark electrodes 1, 1' are made substantially hemispherical and face each other a distance of 25 to 30 mm apart. It is also possible to arrange two blunt electrodes or a plurality of blunt electrodes of a common plate-shaped counter electrode opposite each other. A pulse high-voltage source 2 of conventional construction, i.e. for example comprising parallel-connected capacitors and a thyratron as switch, feeds the capacitor $C_1$ serving as capacitive energy storage means successively up to the static breakdown voltage. The voltage of the capacitor $C_1$ is applied to the spark electrodes 1, 1'. A spark discharge then takes place between the spark electrodes 1, 1' and effects the preionization of the working gas of the laser. Since the capacitor $C_1$ is connevcted low-inductively to the spark discharge gap good adaptation of the spark suply circuit to the inductance of the spark is achieved. The electrical energy stored in the capacitor $C_1$ (from the pulse high-voltage source 2) is therefore converted with good efficiency to the spark formation so that the preionization also takes place with correspondingly good efficiency. The preionization lasts only some tens of nanoseconds.

As apparent from the Figures the supply circuit for the spark discharge does not require its own switch. The switch in the pulse high-voltage source 2 (e.g. a thyratron) is not subjected to any particular load. The spark thus acts as "switch".

Charging of the capacitor $C_1$ lasts typically about 50 to a few hundred ns.

Figure 4A:
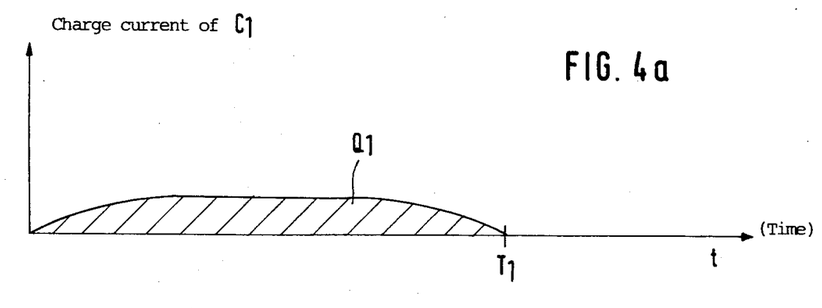
FIGS. 4a and 4b show the variation of the charge current of the capacitive energy storage means or the spark current (high-voltage pulse) as a function of the time.

FIG. 4a shows the variation of the charge current of the capacitor $C_1$ with time. The charge quantity stored in the capacitor $C_1$ is denoted by $Q_1$ and corresponds to the area beneath the curve according to FIG. 4a.

Figure 4B:
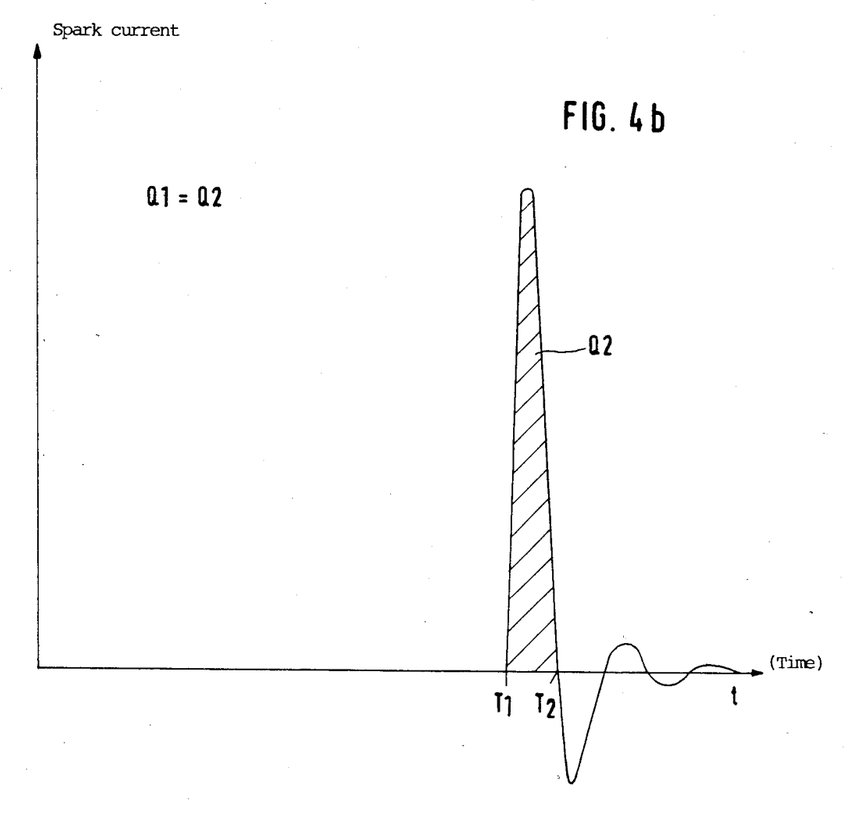

FIG. 4b shows the variation of the spark current with time, the two time scales of FIGS. 4a and 4b being identical.

At the instant $T_1$ the spark discharge is initiated between the spark electrodes 1, 1'. The energy stored in the capacitor $C_1$ is transferred mainly in a current pulse to the spark discharge. The charge $Q_2$ flowing in the spark current is substantially equal to the charge $Q_1$ of the capacitor $C_1$. The start instant $T_1$ of the spark current corresponds substantially to the instant $T_1$ (e.g. 400 ns) of the charging of the capacitor $C_1$ according to FIG. 4a.

It is also apparent from FIG. 4b that the high-voltage pulse formed by the spark discharge is considerably compressed in time compared with the charging time period, typically by a factor of 10, i.e. the period $T_1$-$T_2$ according to FIG. 4b is about ten times shorter than the period 0-$T_1$ according to FIG. 4a.

The good adaptation of the supply circuit to the spark impedance also manifests itself in the rapid decay of the oscillations of the spark current shown in FIG. 4b (the negative swing of the spark current shown in FIG. 4b is a so-called "overshoot").

In the Figures $L_1$ denotes the current path along which the current flows in the preionization of the working gas of the laser. $L_2$ denotes the current path in which the current flows in the generation of a compressed high-voltage pulse.

$C_1$ denotes the capacitive energy storage means (capacitor) whose energy is used for generation of the spark discahge while $C_2$ denotes the capacitive energy storage means (capacitor) whose energy is used for generation of a compressed high-voltage pulse.

Figure 2A:
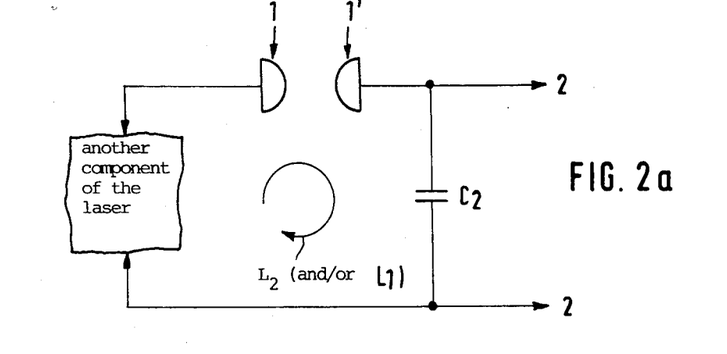
FIG. 2a shows a further example of embodiment of a circuit according to the invention for generating a compressed high-voltage pulse.

FIG. 2a shows a circuit with which a preionization and/or the generation of a compressed high-voltage pulse can be carried out. If only a compressed high-voltage pulse is to be generated and is to be introduced into another element of the laser the spark current flowing between the spark electrodes 1, 1' serve solely to generate the short high-voltage pulse according to FIG. 4b. Simultaneously, however, the spark discharge between the spark electrodes 1, 1' according to FIG. 2a can also be used optionally for the preionization of the working gas of the laser.

Figure 2B:
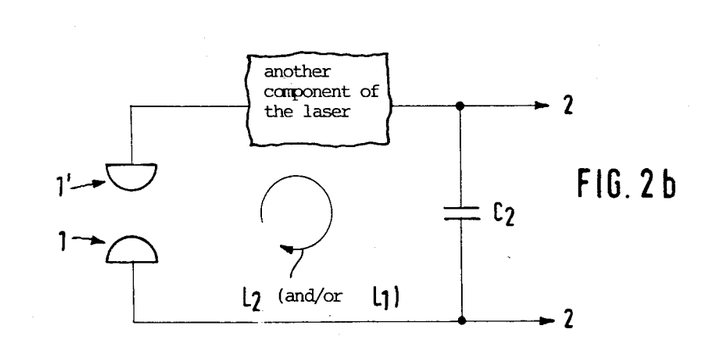
FIG. 2b also shows a circuit for generating a compressed high-voltage pulse.

FIG. 2b shows a variant of the circuit according to FIG. 2a which requires no further explanation.

Figure 3A:
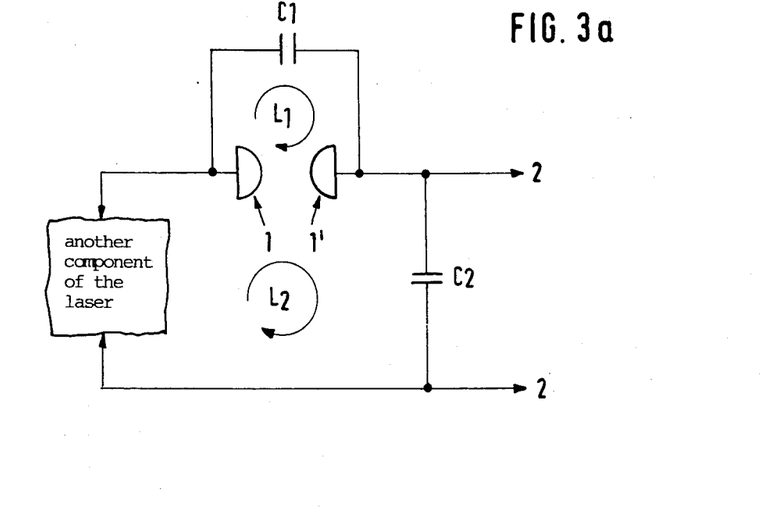
FIG. 3a shows a further example of embodiment of a circuit according to the invention in which both the preionization and the pulse compression is carried out.
Figure 3B:
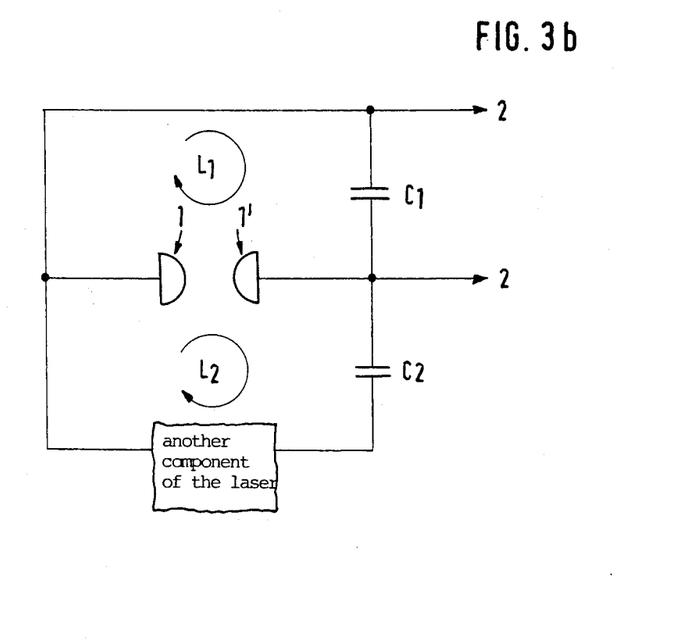
FIG. 3b shows another example of embodiment of a circuit according to the invention in which likewise both the preionization and the pulse compression is carried out.

FIGS. 3a and 3b show further circuits in which it is immediately clear that simultaneously both the preionization by means of the capacitor $C_1$ via the current path $L_1$ and the generation of a compressed high-voltage pulse by means of the energy stored in the capacitor $C_2$ via the current path $L_2$ are possible. The two capacitors $C_1$ and $C_2$ are simultaneously charged by the pulse high-voltage source 2.

The term "another component of the laser" in the drawings can for example be the primary winding of a pulse transformer or the supply circuit of the plasma discharge (main discharge).

The configuration of the spark electrodes specified and the spacing apart specified effect that the spark discharges with a plurality of spark electrode pairs disposed in the laser chamber take place practically simultaneously. By the adaptation of the low-inductive spark supply circuit to the impedance of the spark the spark discharge is completed after some tens of nanoseconds.

Since the spark circuit is low-inductive (its inductance is typically more than 30 times smaller than the inductance of the pulse high-voltage source 2) the peak spark current is considerably higher than the peak current of the pulse high-voltage source 2. Since the brightness of the spark increases disproportionately greatly with the spark current an intensive preionization takes place.

Consequently, the energy required for the preionization is not greater than a few Joule. The efficiency in the conversion of the energy stored in the capacitor $C_1$ to UV light is greater than in the known preionization systems.

The life of the preionization system is substantially greater than that of conventional systems in which in the spark discharge charge quantities up to about 10 times greater are transported.

The generation of the compressed high-voltage pulse does not subject the spark electrodes to much load either. Since moreover the energies of the compressed high-voltage pulses are relatively small and make up only a small part of the energy of the plasma discharge and this energy is transferred through a plurality of sparks (typically more than 20), the load on the spark electrodes remains small so that the erosion processes typical of spark gaps do not occur. Since the sparks are disposed together with the other components of the laser receiving the power in the laser chamber the inductance in the consumer circuit ("other component of the laser") remains comparable to the inductance of the spark discharge circuit for the preionization. Although the compressed high-voltage pulse contains only a small amount of energy compared with the energy of the plasma discharge its power nevertheless remains high so that it cannot be switched by so-called "punctual switches", such as a thyratron. The use of the spark as switch makes a punctual switch in the laser chamber superfluous.

In all possible circuits it must be ensured that the capacitive energy storage means $C_1$ and $C_2$ can be charged from the pulse voltage source before the initiation of the spark discharge. This must be permitted by the design of the component referred to in the drawings, 2, 3, 3a as "another component of the laser".

Figure 5:
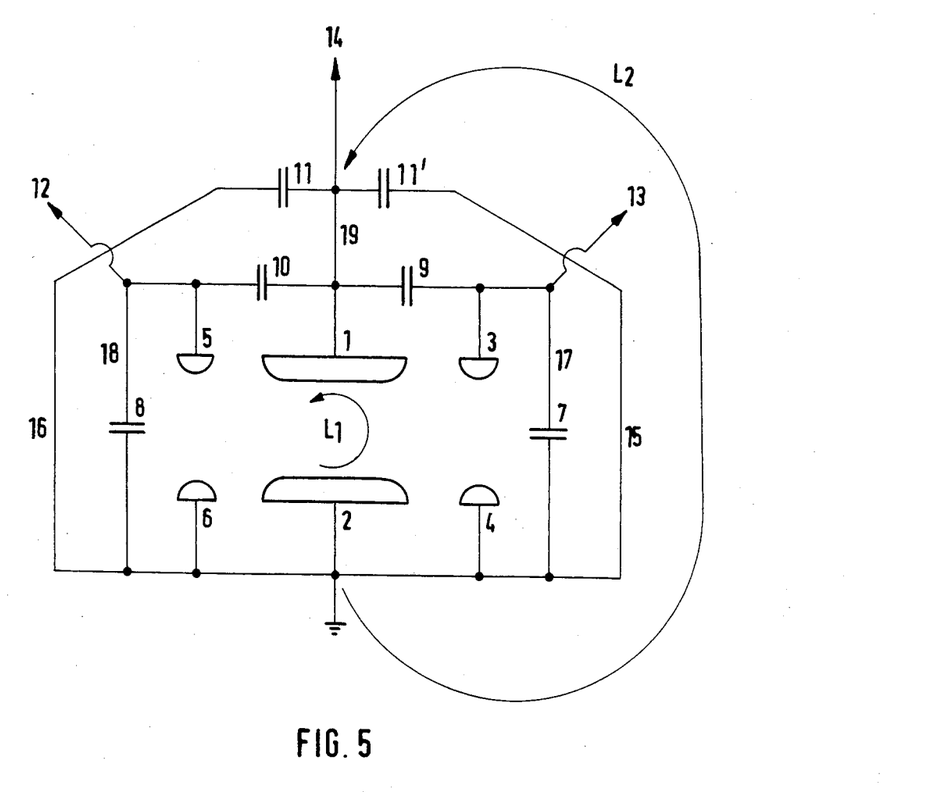
FIG. 5 shows a further example of embodiment of a circuit according to the invention and FIG. 6 shows a typical time variation of the voltage between the main electrodes.
Figure 6:
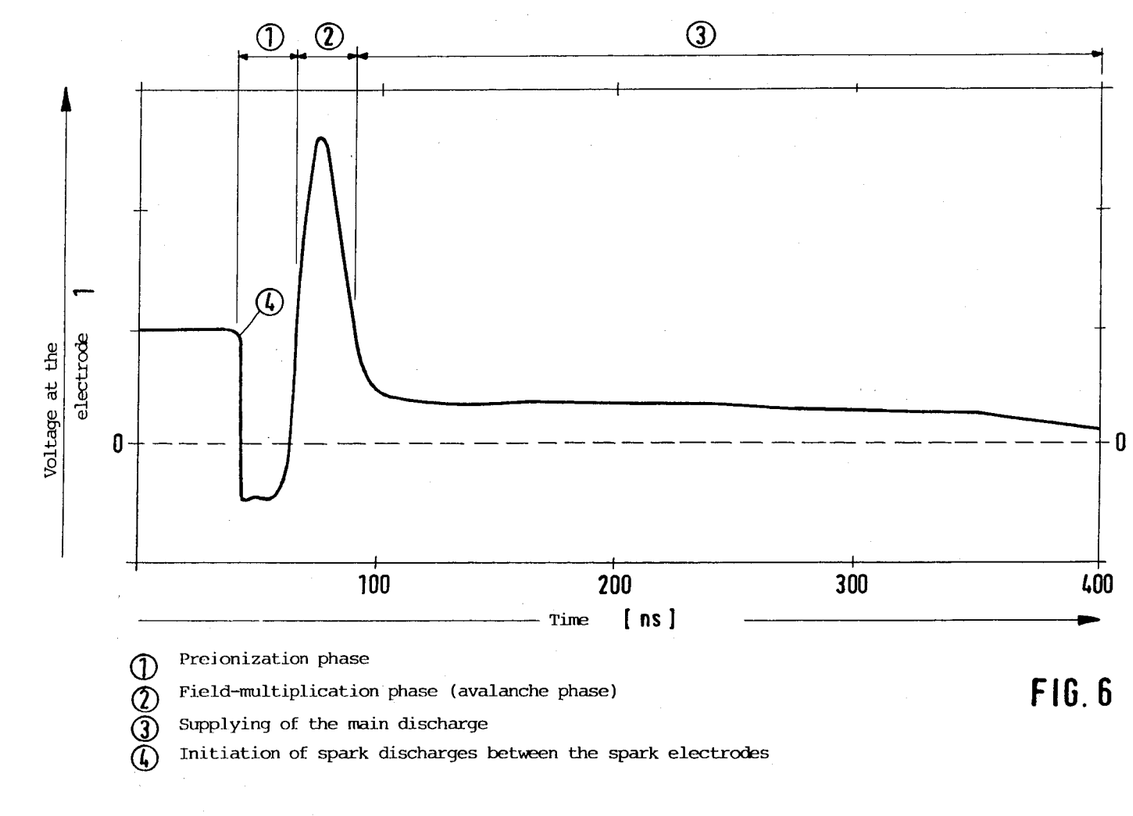

FIGS. 5 and 6 show a use according to the invention of the compressed high-voltage pulse generated as described above as prepulse for controlling the plasma discharge (main discharge).

The homogeneous main discharge for stimulating the working gas of the laser burns between the main electrodes 1 and 2. The arrangement of the main electrodes 1, 2 and of the spark electrodes 3, 4, 5 and 6 is known per se and need not be discussed in detail here.

From pulse voltage sources (not shown) known per se the capacitors 7, 8, 9 and 10 are charged via the connections 12 and 13. The capacitors 7 and 9 as well as 8 and 10 store the electrical energy from which a spark discharge between the spark electrodes 3 and 4 as well as 5 and 6 respectively is fed. This energy also serves to generate a time-compressed, i.e. short high-voltage pulse, as described above.

The charging of the capacitors 7, 8, 9 and 10 last typically a few hundred ns. To enable the switching element of the pulse voltage source (not shown), for example a thyratron, to operate under relaxed conditions, all the spark discharges between the spark electrodes 3 and 4, 5 and 6 (still more spark electrodes can be provided) are intiated synchronously. As soon as the spark discharge starts the sparks generate short-wave radiation by which the working gas in the laser chamber and in particular between the main electrodes 1 and 2 is preionized, i.e. by the short-wave radiation free electrons are generated in the working gas.

The capacitive energy storage means 7, 8, 9 and 10 are charged by the pulse voltage source (not shown) in such a manner that a voltage is achieved between the spark electrodes 3 and 4, 5 and 6 of several times the static breakdown voltage. Thereafter the energy stored in the capacitive energy storage means (capacitors) is switched by the sparks themselves, i.e. the spark executes an independent switch function. Since the capacitors 7 and 9, 8 and 10 are connected in each case low-inductively to the spark discharge gaps between the spark electrodes 3 and 4, 5 and 6 respectively, the spark discharge not only effects the preionization but at the same time also generates a compressed high-voltage pulse. Said high-voltage pulse is applied as so-called prepulse by means of the capacitors 9 and 10 to the main electrode 1. As a result between the main electrodes 1 and 2 a voltage variation occurs which is influenced by the prepulse. Apart from the prepulse transmitted via the capacitors 9 and 10 at the main electrode 1 there is also the charge voltage of the capacitive energy storage means (capacitors) 11 and 11' which have been charged previously via the supply line 14 from a voltage source (not shown) known per se, such as a pulse voltage source. To generate long pulses of a few hundred nd duration typically the capacitors 7, 9, 8 and 10 are charged via the supply lines 12 and 13 to voltages above 20 kV whilst via the supply lines 14 the capacitors 11, 11' are charged to below 10 kV. These values are only by way of example.

Typical values for the capacitances of the capacitors 11 and 11' are 1.3 μF per meter discharge length. The capacitors 7, 8, 9 and 10 each have a typical capacitance of 30 nF per meter discharge length and the sum of the capacitances of the capacitors 9 and 10 corresponds substantially to the sum of the capacitances of the capacitors 7 and 8.

At the instant of the initiation of the spark discharges between the spark electrodes 3 and 4, 5 and 6 the charging of all the capacitors is completed.

In FIG. 5 two inductances essential to the circuit are shown schematically. L1 is the inductance of the circuit in which the prepulse in the initiation and on strikeover of the main discharge closes its current path whilst L2 is the inductance of the circuit in which the discharge current of the main discharge flows. The latter inductance is measured on the shortest travel along which the current path closes on the two terminal sides of the capacitive energy storage means 11, 11'.

The ratio of the two said inductances (i.e. their magnitude) plays an important part in the generation of the prepulse. The capacitive energy storage means 11, 11' for the main discharge usually has a capacitance which is greater than the sum of all the other capacitances so that all rapid voltage changes which are transmitted via the capacitors 9 and 10 from the spark electrodes 3 and 5 to the main electrode 1 are short-circuited by the capacitive energy storage means 11, 11' to ground (FIG. 5).

Since the voltage changes in question here are very rapid (far below 100 ns) all the voltage changes at the main electrode are subjected to the laws of the inductive voltage divider. To obtain as high and intensive a prepulse as possible it is desirable to make the quotients of the inductances L2/L1 as large as possible. On the other hand, the rapid energy depositing in the main discharge between the main electrodes 1 and 2 requires an inductance L2 which is as small as possible. In the example of embodiment described with a ratio of the inductances L2/L1 of about 4 good results are obtained. The very low inductance L1, whose value depends on the selected geometrical arrangement of the conductors and components, has in the example of embodiment a value of about 5 nH so that the inductance L2 can be kept in the range of about 20 nH which still permits a favourable transfer of the energy stored in the capacitive energy storage means 11, 11' to the main discharge.

The inductance L2 consists substantially of the natural inductance of the electrical lead-throughs and lines. It is also possible to attach at the point 19 (FIG. 5), i.e. in the circuit between the main electrode 1 and the capacitive energy storage means 11, 11' associated therewith, in addition a magnetically saturable inductance. Such magnetically saturable inductances are known per se, for example this may be a flat band with core (see the publications (3), (4), (5) and (6) cited at the beginning). For the period of the prepulse this saturable inductance at 19 increases the inductance L2 so that the inequality $L2 >> L1$ is satisfied. For the period after the prepulse this inductance at 19 becomes saturated so that in this phase the requirement of as small as possible an inductance L2 is met. The use of a saturable inductance is one variant of the example of embodiment shown.

A comparison of the circuit arrangement described with the aid of FIG. 5 shows that it is possible here to apply the prepulse directly and with high efficiency to the main electrode 1 without an additional separation being necessary between the main electrode 1 and the capacitive energy storage means 11, 11' associated therewith.

To obtain the desired time variation of the prepulse the voltages which in turn are applied via the supply line 14 to the capacitive energy storage means 11 of the main electrodes 1 and 2 and the voltages which are applied via the terminals 12 and 13 to the capacitors 7, 8, 9 and 10 must have the same sign (measured with respect to the common ground potential, FIG. 5).

FIG. 6 shows the time variation of the voltage at the main electrode 1 influenced by the prepulse. At the instant of the strikeover of the spark discharges between the spark electrodes 3 and 4 and 5 and 6 respectively the charge voltage of the capacitors 11, 11' is present between the main electrodes 1 and 2. The initial polarity of the prepulse is selected such that firstly the prepulse transmitted via the capacitors 9 and 10 to the main electrode 1 greatly reduces the voltage thereof, for example to a value close to 0. This reduced voltage between the main electrodes 1 and 2 is maintained for a short time of for example 15 ns. In this time the working gas between the main electrodes is preionized by the short-wave radiation from the spark discharge. Here for example the $10^7$ free electrons per $cm^3$ mentioned at the beginning are generated. Only thereafter does the voltage between the main electrodes 1 and 2 increase rapidly until due to the filled multiplication of the free electrons (avalanche processes) then starting the discharge occurs in the working gas, the concentration of the free electrons being about $10^{13}$ to $10^{15}$ per $cm^3$. During this phase of the field multiplication the polarity of the prepulse is the same as the charge voltage of the capacitors 11, 11' present at the main electrodes so that the two voltages add up. This time sequence of the prepulse is possible because the inductance L1 is made adequately small.

Compared with the prior art set forth in the introduction to the description the circuit according to the invention of FIG. 5 also has the advantage that with the initiation of the energy transfer from the pulse voltage source (not shown) via the terminals 12 and 13 to the capacitors 7, 8, 9 and 10 the entire laser system with all its processes takes place completely automatically, i.e. the preionization, the generation of the prepulse and the main discharge. Consequently, no special time synchronization and controls are necessary for these three processes.

I claim:

1. A circuit for preionization and main plasma discharge of a pulsed gas laser comprising
    a supply circuit for supplying energy to a plasma discharge,
    transverse stimulation of a working gas by said plasma discharge between main electrodes disposed in a chamber of said laser,
    at least one spark electrode pair in the laser chamber,
    a pulse voltage source for charging capacitive energy storage means, wherein
    the capacitive energy storage means is connected low-inductively to a spark discharge taking place between the spark electrodes,
    the capacitive energy storage means is charged by said pulse voltage source until a static breakdown voltage is achieved between the spark electrodes, thereafter a spark discharge takes place between the spark electrodes, in which the spark itself switches the energy stored in the low-inductively connected capacitive energy storage means.

2. A circuit according to claim 1, characterized in that a plurality of spark electrodes are arranged adjacent each other such that on initiation of a spark discharge all the other spark discharges fire with negligible delay.

3. A circuit according to claim 1, characterized in that at least one of the spark electrodes is made blunt on its side facing the counter electrode.

4. A circuit according to claim 1, characterized in that the spark electrodes have a spacing of at least 5 mm.

5. Circuit for preionization and main discharge of a pulsed gas laser comprising
    transverse stimulation of a working gas by a plasma discharge between main electrodes disposed in a chamber of said laser for generating the main discharge,
    one or more spark electrodes for producing the preionization,
    at least one pulse voltage source for charging capacitive energy storage means for supplying the main and spark electrodes,
    wherein
    the capacitive energy storage means for the spark electrodes are connected low-inductively to a spark discharge taking place between the spark electrodes,
    the capacitive energy storage means for the spark electrodes is charged by said pulse voltage source and thereafter a spark discharge takes place between the spark electrodes, in which the spark switches the energy stored in the low-inductively connected capacitive energy storage means, wherein
    the spark discharge comprises a current which is used both for the preionization and for generating a compressed high-voltage pulse, and
    the high-voltage pulse is applied as prepulse directly to the main electrodes so that the voltage obtained at the main electrodes due to the capacitive energy storage means at the main electrodes is momentarily substantially increased and thereby a homogenous main discharge is initiated and supplied.

6. Circuit according to claim 5, characterized in that the prepulse has negative and positive amplitudes at different times and is applied directly to the main electrodes such that prior to the increase a momentary lowering of the voltage applied to the main electrodes takes place.

7. Circuit according to claim 5, characterized in that an inductance of the circuit in which the prepulse flows is smaller than an inductance of the circuit in which the discharge current of the main discharge flows.

8. Circuit according to claim 5, characterized in that as capacitive energy storage means for the main discharge capacitors are provided which are each connected with an input to a ground potential whilst two other inputs are jointly connected via a line to a voltage source, said line also being connected as supply line to one of the main electrodes, and that the capacitive energy storage means for the spark electrodes are connected symmetrically with respect to the supply line to the main electrode by two pairs of capacitors, one of the capacitors of each of the capacitor pairs being connected with an input to the supply line to one of the main electrodes and the other capacitor of the respective capacitor pairs being connected with an input to the ground potential and to one of two connecting lines connected between the capacitors of each capacitor pair, with both an impulse voltage source connected to the energy storage means for the spark discharge and one of said spark electrodes being connected to each of said connecting lines.

9. Circuit according to claim 8, characterized in that the voltages applied to the supply line, to one of said main electrodes, and to the connection lines for the spark electrodes are of identical polarity.

10. A circuit for preionization and main plasma discharge of a pulsed gas laser comprising
    transverse stimulation of a working gas by said plasma discharge between main electrodes disposed in a chamber of said laser,
    at least one spark electrode pair in the laser chamber,
    a pulse voltage source for charging capacitive energy storage means, wherein
> the capacitive energy storage means is connected low-inductively to a spark discharge taking place between the spark electrodes,
>
> the capacitive energy storage means is charged by the pulse voltage source until a static breakdown voltage is achieved between the spark electrodes, thereafter a spark discharge takes place between the spark electrodes, in which the spark itself switches the energy stored in the low-inductively connected capacitive energy storage means, such that a current flowing in the spark discharge is used as a switch for the generation of a compressed high-voltage pulse.

11. A circuit according to claim 10, characterized in that the energy switched by said spark is used for said preionization and for generation of a compressed high-voltage pulse, the energy utilized for preionization and for generation of the compressed high-voltage pulse originating to at least 50% from the capacitive energy storage means.

12. A circuit according to claim 10, characterized in that for all sparks a current path, measured along the shortest travel in which at least 50% of the energy flows, is in each case not longer than 100 cm.

13. Circuit for preionization and main plasma discharge of a pulsed gas laser according to claim 10, wherein said comprssed high-voltage pulse is applied as a prepulse to the main electrodes of the laser.

* * * * *